Patented Oct. 17, 1922.

1,432,668

UNITED STATES PATENT OFFICE.

ALBERT W. CHASE AND WALLACE B. VAN ARSDEL, OF BERLIN, NEW HAMPSHIRE, ASSIGNORS TO BROWN COMPANY, OF BERLIN, NEW HAMPSHIRE, A CORPORATION OF MAINE.

METHOD OF PREPARING CATALYTIC MATERIAL.

No Drawing. Application filed September 24, 1921. Serial No. 503,062.

*To all whom it may concern:*

Be it known that we, ALBERT W. CHASE and WALLACE B. VAN ARSDEL, citizens of the United States, residing at Berlin, in the county of Coos and State of New Hampshire, have invented new and useful Improvements in Methods of Preparing Catalytic Material, of which the following is a specification.

This invention has relation to nickel catalysts, such as are employed in the hydrogenation of fatty acids and the glycerides and esters thereof, and more particularly to those catalysts that are prepared from nickel carbonate.

In the preparation of such nickel catalysts, it is customary to precipitate the nickel carbonate by causing a reaction between nickel chloride or sulphate and sodium carbonate in accordance, for instance, with the following formula: $NiCl_2 + Na_2CO_3 = NiCO_3 + 2NaCl$. It is customary in such a procedure to wash the precipitate free of soluble impurities immediately after boiling out excess carbon dioxide, but, owing to the nature of the gelatinous precipitate, notable quantities of soluble salts remain even after the washing operation, the salts being apparently occluded in the gelatinous precipitate.

We have discovered that, if the unwashed or partially washed carbonate be calcined to nickel oxide, the gel form of the carbonate is destroyed, and that the remaining soluble impurities are easily washed out so that the product has a greatly increased catalytic activity as a result of the removal of poisons ordinarily left in after the first washing. Thus it will be seen that, in accordance with our process, the calcination of the precipitate is followed by a final washing by which the soluble impurities are removed. It is not material whether the precipitate be first washed before the calcination takes place, although it may be desirable to effect such a washing for the removal of the greater portion of the impurities. After the washing of the nickel carbonate following the calcination, the nickel oxide is dried and reduced at a proper temperature with hydrogen in a reducing furnace.

What we claim is:

A method of producing a nickel catalyst from precipitated nickel carbonate, which comprises calcining the precipitate to destroy the gel form, then washing the product for the removal of soluble impurities, and finally drying and reducing the nickel oxide resulting from such calcination.

In testimony whereof we have affixed our signatures.

ALBERT W. CHASE.
WALLACE B. VAN ARSDEL.